United States Patent [19]

O'Malley

[11] 3,862,581
[45] Jan. 28, 1975

[54] FOUR SPEED TRANSMISSION

[75] Inventor: John J. O'Malley, Livonia, Mich.

[73] Assignee: General Motors Corporation, Detroit, Mich.

[22] Filed: Feb. 4, 1974

[21] Appl. No.: 439,273

[52] U.S. Cl. ................... 74/759, 74/731, 74/761, 74/763
[51] Int. Cl. ..................... F16h 57/10, F16h 47/00
[58] Field of Search ........... 74/730, 731, 732, 753, 74/758, 759, 761, 762, 763, 765, 325

[56] References Cited
UNITED STATES PATENTS

| | | | |
|---|---|---|---|
| 3,067,632 | 12/1962 | Foerster et al. | 74/759 |
| 3,564,938 | 2/1971 | Hause | 74/732 X |
| 3,661,035 | 5/1972 | Liang | 74/763 |
| 3,730,022 | 5/1973 | O'Malley | 74/759 |
| 3,752,009 | 8/1973 | Chana | 74/731 X |
| 3,797,332 | 3/1974 | Cameron et al. | 74/763 |

Primary Examiner—Samuel Scott
Assistant Examiner—Lance W. Chandler
Attorney, Agent, or Firm—Donald F. Scherer

[57] ABSTRACT

A planetary transmission having three planetary gear sets (front, intermediate and rear) and a plurality of friction devices and two one-way devices for establishing four forward and one reverse ratio. The intermediate set multiplies the reaction of the front set to increase the reaction of the rear set to provide a gear reduction in the first ratio. The one-way devices are connected to the rear set reaction member and lockup on opposite directions, so that a member of the intermediate set, connected with one of the one-way devices, is stationary in first gear and rotates freely in second gear. The other one-way device is connected to ground to maintain the rear set reaction member stationary in both the first and second gear ratios. Third gear is established through the front set only, and reverse is established through the rear set only.

4 Claims, 1 Drawing Figure

PATENTED JAN 28 1975
3,862,581
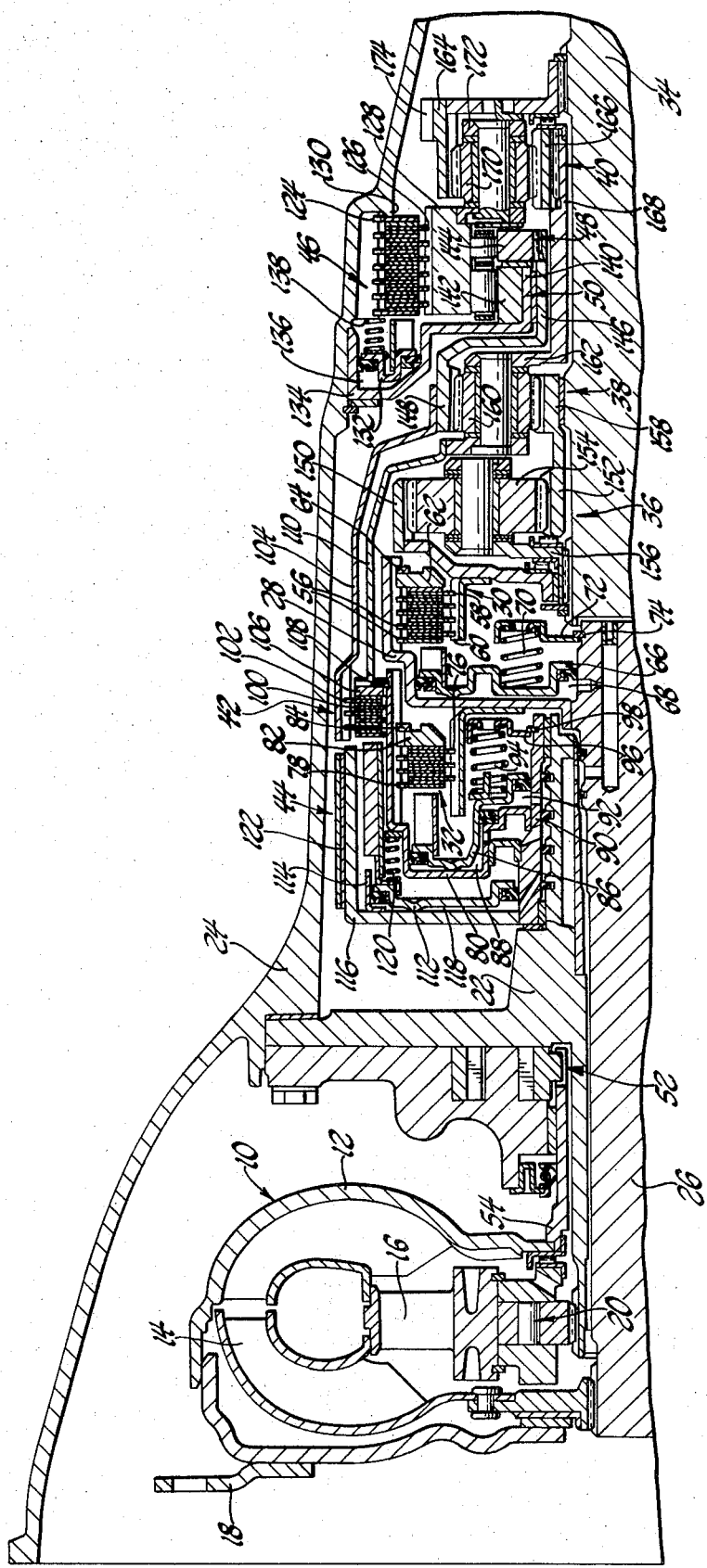

FOUR SPEED TRANSMISSION

This invention relates to planetary transmissions and more particularly to four speed planetary transmissions wherein the planetary reaction for the first and second ratios is through one-way devices.

Four speed transmissions are particularly useful with passenger vehicles having low power prime movers. There are many four speed planetary transmissions in the prior art. A good number of these transmissions use the three speed transmission, disclosed in U.S. Pat. No. 2,856,794, as a basic unit and couple an additional planetary set thereto for added ratio coverage. These transmissions however, have one or more disadvantages. The first two forward ratios are not established by one-way devices, unless a selectively engageable friction brake is combined therewith to ground one of the one-way devices, or the reverse ratio is a compound ratio, which usually results in an unnecessarily high numerical ratio for passenger type vehicles. The prior art transmissions which provide one-way reaction in the first two forward ratios have a disadvantage in that the one-way devices must be seperately grounded to the transmission case and in some instances these transmissions require the use of two friction brakes and one friction clutch to establish a reverse drive.

The present invention provides four forward speeds and one reverse speed, and has one-way devices and a clutch which combine with the gearing to establish the first two forward gear ratios. Both of the one-way devices are operatively connected to the reaction element of a simple planetary set and are disposed to provide a locking connection in opposite directions of rotation. One of the one-way devices is grounded to the transmission case while the other one-way device is operatively connected to an element of another planetary gear set. The second mentioned planetary gear set is also controlled by a friction clutch, which when engaged, prevents the one-way device associated therewith from establishing a drive connection with the reaction member of the first mentioned planetary set due to the direction of rotation imposed on the second planetary set.

The reverse drive ratio in the present invention is established by the engagement of a single friction clutch and single friction brake to provide a simple gear reduction. The first two forward drive ratios are reduction ratios accomplished through two or more planetary sets. The third forward ratio is a simple planetary reduction ratio, and the fourth forward ratio is a direct drive.

It is an object of this invention to provide an improved transmission wherein the first two forward drive ratios are established through one-way drive devices which both react on one planetary member.

It is another object of this invention to provide an improved planetary transmission wherein the first two forward drive ratios are established through one-way devices which are operatively connected with one member of the planetary set and are disposed to lock in opposite directions of rotation.

Another object of this invention is to provide an improved planetary transmission having four forward speeds and a reverse speed wherein the first two forward speeds are established through one-way devices and the reverse speed is a single reduction ratio.

Another object of this invention is to provide an improved four speed planetary transmission having three planetary gear sets wherein during the first speed ratio one planetary set is connected to be driven by the input shaft, the second planetary set is connected to the reaction member of the the first planetary set directly and to the reaction member of the third set through a one-way device such that the reaction of the first planetary set is multiplied by the second planetary set before being transmitted to the output shaft through the third planetary gear set.

These and other objects and advantages of the present invention will be more apparent from the following description and drawing, which drawing is a cross sectional elevational view of a four speed planetary transmission including the preferred embodiment of the invention.

The transmission includes a conventional torque converter 10 having an impeller 12, a turbine 14 and a stator 16. The impeller 12 is adapted to be driven by a conventional engine, not shown, through a flex plate 18 which is adapted to be secured to the engine output. The stator 16 is connected through a one-way device 20 to a stator and clutch support member 22 which is secured to stationary case 24 which encloses the transmission. The turbine 14 is splined to a transmission input shaft 26 which in turn provides the transmission input drive through a hub 28 to a pair of conventional selectively fluid operated friction clutches 30 and 32. As will be described later, the clutch 30 is engaged for all forward drives and the clutch 32 is engaged for the direct forward drive and the reverse drive.

The transmission also includes an output shaft 34, a front planetary gear set 36, an intermediate planetary gear set 38 and a rear planetary gear set 40, which planetary gear sets are selectively controllable by the clutches 30 and 32, a selectively operable clutch 42 a pair of selectively operable brakes 44 and 46, and a pair of one-way devices 48 and 50 to provide four forward speeds and a reverse speed between the transmission input shaft 26 and the output shaft 34.

The selectively operable clutches and brakes of this transmission are preferable fluid operated by conventional control system, which is provided with fluid from a conventional internal and external gear pump 52, which is driven from the vehicle engine through the impeller 12 and a hollow shaft 54 secured to the impeller 12. The clutch 30 has a plurality of friction discs 56 splined to the hub 28, and a plurality of friction discs 58 splined to an output hub 60. The friction discs 56 and 58 are limited in their rightward movement by a backup plate 62 which is splined to the hub 28 and positioned therein by a snap ring 64. The friction discs 56 and 58 are urged into abutting relationship during engagement by a piston 66, which is slidably disposed in the hub 28 so as to form a pressure chamber 68 therewith such that fluid pressure can be utilized in the chamber 68 to control engagement of the clutch 30. The clutch 30 is disengaged by a plurality of return springs, such as the one shown at 70, which are compressed between the piston 66 and a retainer ring 72 which is positioned on the input shaft 26 by a snap ring 74.

The clutch 32 has a plurality of friction discs 76 splined to the input hub 28, and a plurality of friction discs 78 splined to a clutch housing 80. Rightward movement of the discs 76 and 78, in the clutch housing 80, is limited by a backup plate 82 which is splined to the housing 80 and positioned therein by a snap ring 84. The friction discs 76 and 78 are selectively moved into abutting relationship during engagement by a piston 86 which is slidably disposed in the housing 80 and cooperates therewith to form a fluid chamber 88 which may be selectively pressurized to engage the clutch 32 and thereby provide a drive connection between the input hub 28 and the clutch housing 80. The piston 86 is also slidably disposed on a sleeve shaft 90 and cooperates with the sleeve shaft and the housing 80 to form a fluid chamber 92 which may also be pressurized to engage the clutch 32. The clutch 32 is a dual apply area clutch, the advantages of which are set forth in U.S. Pat. No. 3,321,056. Briefly, this type of clutch permits different engagement forces to more closely control the clutch capacity for different input torques which are present at the clutch during different drive ratios. Disengagement of the clutch 32 is provided by a plurality of springs such as 94 which are compressed between the piston 86 and a retainer ring 96 located on the shaft 90 by a snap ring 98.

The clutch 42 has a plurality of friction discs 100 splined to the clutch housing 80 and a plurality of friction discs 102 splined to a hub 104. Rightward movement of the friction discs 100 and 102 is limited by a backup plate 106 which is located on the housing 80 by a snap ring 108. Also drivingly connected to the housing 80 and splined to rotate therewith is a hub 110. The clutch 42 is selectively engaged by a piston 112 which is slidably disposed on the sleeve shaft 90 and a cup 114 which is secured to a brake drum 116 which drum 116 is secured to the sleeve shaft 90. A pressure chamber 118 is formed by the components 90, 112, 114, and 116, which chamber 118 may be selectively pressurized to cause the piston 112 to engage the clutch 42. The clutch 42 is disengaged by a plurality of return springs such as 120 which are compressed between the piston 112 and the housing 80.

The brake drum 116 is encircled by a brake band 122 which is a component of the brake 44. The brake band 122 is adapted to engage the brake drum 116 to hold the drum stationary. The control for the brake band 122 may be any of the conventional servo type controls and in particular may be designed in accordance with the servo control disclosed in U.S. Pat. No. 3,321,056.

The brake 46 includes a plurality of friction discs 124 splined to the transmission case 24 and a plurality of friction discs 126 splined to an annular member 128. The rightward movement of the friction discs 124 and 126 is limited by a shoulder 130 formed on the transmission case 24. The brake 46 is engaged by a piston 132 which is slidably disposed in a housing 134 between which housing and piston is formed a chamber 136 which may be selectively pressurized to move the piston 132 to engage the brake 46. The brake 46 is disengaged by a plurality of return springs such as 138 which are compressed between the piston 132 and the transmission case 24.

The housing 134 is secured to the transmission case 24 and has an inner flange portion 140 to which is secured an annular member 142 which provides the inner race for the one-way device 50. The outer race of the one-way device 50 is provided by the annular member 128.

The annular member 128 also provides the outer race for the one-way device 48. An inner race 144 of the one-way device 48 is splined to a flange 146, which is integral with or otherwise secured to a ring gear 148 which in turn is secured to the hub 104.

The front planetary gear set 36 includes a ring gear 150, a sun gear 152, a plurality of pinion gears 154, meshing with the ring gear 150 and sun gear 152, and a planet carrier 156 on which are rotatably mounted the pinions 154. The planet carrier 156 is splined to the output shaft 34. The ring gear 150 is secured to the output hub 60 of the clutch 30, such that when the clutch 30 is engaged the ring gear 150 is driven by the input shaft 26.

The intermediate planetary gear set 38 includes the ring gear 148 and a sun gear 158 which is formed integral with or otherwise secured to the sun gear 152. A plurality of pinion gears 160 mesh with the ring gear 148 and sun gear 158 and are rotatably supported on a planet carrier 162 which is secured to the member 110. Since the member 110 will be driven by the input shaft 26 whenever the clutch 32 is engaged, the carrier 162 will also be driven by the input shaft 26 when the clutch 32 is engaged.

The planetary gear set 40 includes a ring gear 164 which is splined to the output shaft 34, and a sun gear 166 which is splined to an annular extension 168 of the carrier 162. A plurality of pinion gears 170 mesh with the ring gear 164 and sun gear 166 and are rotatably mounted on a carrier 172 which is secured to the annular member 128. As described above, when the clutch 32 is engaged the carrier 162 is driven by the input shaft, the sun gear 166 will also be driven by the input shaft 26. A gear 174 is formed on the outer periphery of the ring gear 164 which gear 174 may be utilized with a conventional parking brake mechanism to provide a transmission output shaft lock for the transmission. For the following description of operation the terms clockwise and counterclockwise are determined by viewing the transmission from the forward or converter end thereof. Clockwise direction is considered as the forward direction of rotation and counterclockwise is considered as the reverse direction of rotation. When the transmission is being driven by the engine, the torque converter 10 and input shaft 26 will always rotate in the clockwise direction. When the clutch 30 is engaged the ring gear 150 will rotate in the clockwise direction. When the clutch 32 is engaged the carrier 162 and sun gear 166 will rotate in the clockwise direction. When the clutch 42 is engaged the intermediate planetary set 38 will be locked up and will rotate as a unit in the clockwise direction when the clutch 32 is engaged or will be stationary when the brake 44 and clutch 42 are engaged. The one-way device 50 is designed to provide a drive connection between the carrier 172 and the transmission case 24 when the carrier 172 attempts to rotate in the counterclockwise direction. The one-way device 48 will provide a drive connection between the ring gear 148 and the carrier 172 through the annular member 128 when the ring gear 148 is rotating or is urged to rotate in the clockwise direction relative to the annular member 128. The brake 46, when engaged will prevent rotation of the carrier 172 and annular member 128 in both directions.

The first forward speed ratio in the transmission is established by the engagement of clutch 30. When the clutch 30 is engaged the ring gear 150 is driven in the clockwise direction. Clockwise rotation of the ring gear 150 tends to rotate the carrier 156 in the clockwise direction and the sun gears 152 and 158 in the counterclockwise direction. The carrier 156 reacts on the output shaft 34 which is initially stationary, therefore the sun gears 152 and 158 rotate counterclockwise. The counterclockwise rotation of sun gear 158 drives the carrier 162 and sun gear 166 in a counterclockwise direction, which tends to rotate the carrier 172 in a counterclockwise direction. Counterclockwise rotation of the carrier 172 is prevented by the one-way device 50, therefore the ring gear 164 and the output shaft 34 rotate in a clockwise or forward direction. The torque, transmitted from the input shaft 26 to the output shaft 34, is split between the carrier 156 and the ring gear 164. The counterclockwise reaction on the carrier 172 and therefore annular member 128 is greater than the clockwise reaction imposed on the annular member 128 by the ring gear 148 through the one-way device 48 such that the ring gear 148 is stationary. Since the reactions on the carrier 172 and one-way device 48 are in opposite directions, only the numerical differences thereof is transmitted to the transmission case 24 through the one-way device 50.

To shift the transmission from the first ratio to the second ratio forward, the clutch 42 is engaged. When the clutch 42 is engaged, the intermediate gear set 38 will rotate as a single unit. Since the sun gear 158 is driven in a counterclockwise direction, the ring gear 148 will also be driven in a counterclockwise direction permitting the one-way device 48 to overrun. The sun gear 166 will continue to be driven in a counterclockwise direction, the carrier 172 will continue to react against the transmission case 4 through the one-way device 50, and the ring gear 164 will continue to rotate in a clockwise or forward direction. Since the intermediate gear set 38 is locked up at this time, the torque intermediate through the carrier 162 is no longer increased by the gear set 38. Thus, the sun gear 166 is rotated more rapidly in a second gear than in first gear with a resulting increase in output speed for a given input speed.

Third gear forward in the transmission is established by engaging the brake 44 while the clutch 42 remains engaged. Engagement of the brake 44 prevents rotation of the intermediate gear set 38 and therefore sun gear 152. Since the sun gear 152 cannot rotate, the carrier 156 and therefore output shaft 34 are driven in a clockwise or forward direction of rotation. The sun gear 166 will also be stationary such that forward rotation of the ring gear 164, in unison with output shaft 34, will cause the carrier 172 to be driven in a clockwise direction such that the one-way device 50 will overrun.

Fourth gear or direct drive forward is established by disengaging brake 44 while engaging clutch 32. The engagement of clutches 30, 32, and 42 provide direct drive connections to the planetary gear set 38, and the planetary gear set 36, which results in direct drive from the transmission input shaft 26 to the transmission output shaft 34.

The reverse drive ratio is established by the engagement of brake 46 and clutch 32, while the remaining clutches and brakes are disengaged. The engagement of clutch 32 causes clockwise rotation of hub 110, carrier 162, and sun gear 166. The engagement of brake 46 prevents rotation of the carrier 172 and since the sun gear 166 is driven clockwise, the ring gear 164 and therefore output shaft 34 driven in a counterclockwise or reverse direction of rotation.

From the above description of the components and operation of the subject transmission it is apparent that the first to fourth forward drive ratios are established by the one-way devices 48 and 50, and that only one of the one-way devices, namely 50, is grounded to the transmission case. This permits the overall length of the transmission to be shortened in that structural connections between the one-way device 48 and the transmission case 24 are not necessary. It is also seen from the above description that the reverse drive ratio of this transmission is provided through the operation of a single friction clutch and single friction brake to provide a simple planetary reduction.

Obviously, many modifications and variations of the present invention are possible in light of the above teachings. It is, therefore, to be understood that within the scope of the appended claims the invention may be practiced otherwise than as specifically described.

What is claimed is:

1. A power transmission having forward and reverse drives comprising; an input shaft; an output shaft; first, second, and third simple planetary gear sets, each having a plurality of members, said first and third planetary gear sets each having first members connected to said output shaft; first clutch for selectively connecting said input shaft to a second member of said first planetary gear set; second clutch means for selectively connecting first and second members of said second planetary gear set together, third clutch means for selectively connecting the second member of said second planetary gear set to said input shaft and cooperating with said second clutch means for connecting said second planetary gear set to rotate in unison with said input shaft; first brake means cooperating with said second clutch means for preventing rotation of said second planetary gear set; second brake means for selectively preventing rotation of a second member of said third planetary gear set; first one way means for providing a drive connection between the first member of said second planetary gear set and the second member of said third planetary gear set in one direction second one way means for grounding said second member of said third planetary gear set in the opposite direction; and means connecting said first and second planetary gear sets and said second and third planetary gear sets; said first clutch means and said first and second one way means being operable to provide a first forward ratio, said first and second clutch means and said second one way means being operable to provide a second forward ratio with said second member of said third planetary gear set being a stationary reaction member.

2. A power transmission having four forward speed ratios and a reverse speed ratio comprising; an input shaft; an output shaft; front, intermediate and rear simple planetary gear sets, said front set having an input member, a reaction member and an output member which output member is connected to said output shaft; said rear planetary gear set having an input member, an output member which is connected to said output shaft and a reaction member; said intermediate planetary gear set having a first member drivingly connected to the reaction member of said front planetary gear set, a second member drivingly connected to the input member of said rear planetary gear set and reaction means including a gear member and one-way drive establishing means for drivingly connecting the gear member to the reaction member of said rear planetary gear set in one direction of rotation only; another one-way drive establishing means for preventing rotation of the reaction member of said rear planetary gear set in a direction opposite to said first mentioned direction; and selectively engageable clutch means for drivingly connecting said input shaft to said input member of said front planetary gear set for establishing one forward speed ratio between said input and output shafts in which speed ratio the reaction of said front planetary gear is multiplied by said intermediate planetary gear set and transmitted therefrom to said output shaft through said rear planetary gear set.

3. A power transmission having four forward speed ratios and a reverse speed ratio comprising; an input shaft; an output shaft; front, intermediate and rear simple planetary gear sets, said front set having an input member, a reaction member and an output member which output member is connected to said output shaft; said rear planetary gear set having an input member, an output member which is connected to said output shaft and a reaction member; said intermediate planetary gear set having a first member drivingly connected to the reaction member of said front planetary gear set, a second member drivingly connected to the input member of said rear planetary gear set and reaction means including a gear member and one-way drive establishing means for drivingly connecting the gear member to the reaction member of said rear planetary gear set in one direction of rotation only; another one-way drive establishing means for preventing rotation of the reaction member of said rear planetary gear set in a direction opposite to said first mentioned direction; first selectively engageable clutch means for drivingly connecting said input shaft to said input member of said front planetary gear set for cooperating with both said one-way means for establishing the first and lowest forward speed ratio between said input and output shafts in which speed ratio the reaction of said front planetry gear is multiplied by said intermediate planetary gear set and transmitted therefrom to said output shaft through said rear planetary gear set; and second selectively engageable clutch means for selectively drivingly connecting two members of said intermediate gear set together and for cooperating with said first clutch means and said other one-way means for establishing the second forward speed ratio.

4. A power transmission having four forward speed ratios and a reverse speed ratio comprising; an input shaft; an output shaft; front, intermediate and rear simple planetary gear sets, said front set having an input member, a reaction member and an output member which output member is connected to said output shaft; said rear planetary gear set having an input member, an output member which is connected to said output shaft and a reaction member; said intermediate planetary gear set having a first member drivingly connected to the reaction member of said front planetary gear set, a second member drivingly connected to the input member of said rear planetary gear set and reaction means including a gear member and one-way drive establishing means for drivingly connecting the gear member to the reaction member of said rear planetary gear set in one direction of rotation only; another one-way drive establishing means for preventing rotation of the reaction member of said rear planetary gear set in a direction opposite to said first mentioned direction; first selectively engageable clutch means for drivingly connecting said input shaft to said input member of said front planetary gear set cooperating with both said one-way means for establishing one forward speed ratio between said input and output shafts in which speed ratio the reaction of said front planetary gear is multiplied by said intermediate planetary gear set and transmitted therefrom to said output shaft through said rear planetary gear set; second selectively engageable clutch means for selectively connecting said second member of said intermediate planetary gear set and said input member of said rear planetary gear set to said input shaft; and selectively engageable friction brake means for selectively preventing rotation of said reaction member of said rear planetary gear set to cooperate with said second clutch means for establishing the reverse drive ratio from said input shaft to said output shaft through said rear planetary gear set only.

* * * * *

PO-1050
(5/69)

UNITED STATES PATENT OFFICE
CERTIFICATE OF CORRECTION

Patent No. 3,862,581  Dated January 28, 1975

Inventor(s) John J. O'Malley

It is certified that error appears in the above-identified patent and that said Letters Patent are hereby corrected as shown below:

Column 5, line 31, "transmission case 4" should read -- transmission case 24 --.

Column 6, line 41, "in one direction second one" should read -- in one direction; second one --.

Signed and sealed this 15th day of April 1975.

(SEAL)
Attest:

RUTH C. MASON
Attesting Officer

C. MARSHALL DANN
Commissioner of Patents
and Trademarks